United States Patent [19]

Adachi et al.

[11] Patent Number: 5,587,437
[45] Date of Patent: Dec. 24, 1996

[54] PROCESS OF PRODUCING VINYL CHLORIDE TYPE POLYMER

[75] Inventors: Fumiaki Adachi; Tadashi Amano; Yoshihrio Shirota; Yoshitaka Okuno, all of Kamisu-machi, Japan

[73] Assignee: Shin-Etsu Chemical Co., Ltd., Tokyo, Japan

[21] Appl. No.: 528,097

[22] Filed: Sep. 14, 1995

[30] Foreign Application Priority Data

Sep. 14, 1994 [JP] Japan .................................. 6-247104

[51] Int. Cl.$^6$ .............................. C08F 2/18; C08F 14/06
[52] U.S. Cl. ........................... 526/68; 526/88; 526/344.2; 526/345
[58] Field of Search ................. 526/344.2, 68, 526/88, 345

[56] References Cited

U.S. PATENT DOCUMENTS 4,125,574  11/1978  Kastner et al. .................. 526/344.2
4,752,640  6/1988  Tomishima et al. .............. 526/344.2

FOREIGN PATENT DOCUMENTS 0526741  2/1993  European Pat. Off. .
1087195  10/1967  United Kingdom .

Primary Examiner—Thomas R. Weber
Attorney, Agent, or Firm—Oblon, Spivak, McClelland, Maier & Neustadt, P.C.

[57] ABSTRACT

This process uses such a polymerization apparatus that the inner volume of the polymerization vessel is 100 m$^3$ or more, the ratio L/D of the length L of the straight barrel to the inner diameter D is 1.5 or more, and the uppermost stirring impeller is arranged in the range of 150 to 300 cm downwardly from the upper end position of the straight barrel of the polymerization vessel in terms of the height of the center line of the vertical width of the blade, and is characterized in that after the liquid contents of the polymerization vessel are heated to a temperature near the polymerization temperature, noncondensable gases coming into the reflux condenser are evacuated under such conditions that the flow rate of the evacuation is 10 to 100 Nm$^3$/hour and the evacuation time is a period equal to 20% or more of the total polymerization time, and simultaneously with or after the start of the evacuation of the noncondensable gases, the cooling by the reflux condenser is started. According to the present invention, even if a long-term operation is carried out by using a large-sized polymerization vessel, since the quantity of heat dissipation by the reflux condenser can be kept stable, and scale can be prevented from being deposited on the polymerization vessel inner wall and the like.

19 Claims, 3 Drawing Sheets

PROCESS OF PRODUCING VINYL CHLORIDE TYPE POLYMER

BACKGROUND OF THE INVENTION

1. Field of the Invention

The present invention relates to a process of producing a vinyl chloride type polymer.

2. Description of the Prior Art

Conventionally, as a polymerization apparatus used for suspension polymerization of a vinyl chloride type monomer or the like, polymerization apparatuses having a polymerization vessel equipped with a reflux condenser, a heating and cooling jacket, an agitator, a nozzle through which raw materials will be charged, a nozzle through which the polymer will be taken out, etc. are known. For the purpose of dissipating the heat of polymerization, these polymerization apparatuses are provided mainly with a reflux condenser and a heating and cooling jacket. Generally, the reflux condenser is arranged at the upper part of the polymerization vessel and is for lowering the temperature of liquid contents by allowing the vapor generated in the polymerization vessel to be introduced into the reflux condenser in which the vapor is cooled with a refrigerant, such as cooling water, to condense into a liquid and allowing the condensate to flow back into the polymerization vessel. The heating and cooling jacket is arranged around the polymerization vessel and is for cooling the contents in the polymerization vessel by introducing cooling water or the like into the jacket. In particular, the reflux condenser is large in cooling capacity and attracts attention in view of an improvement in productivity or a saving in energy.

On the other hand, recently, for the purpose of improving productivity, there are attempts on that the polymerization vessel itself is large-sized and the polymerization time is shortened. However, where the polymerization time is shortened, since the quantity of the heat generated per unit time is increased, the cooling of the polymerization vessel only by the heating and cooling jacket reaches the limit, and therefore necessity results wherein the ability of heat dissipation by the reflux condenser is increased. Meanwhile, in order to repeat the polymerization with keeping the quality of the polymer obtained in each batch constant, it is required to keep the quantity of heat dissipation of each batch by the reflux condenser in good reproducibility. Generally, however, where the load of the heat dissipation of the reflux condenser is increased, the slurry foams in the polymerization vessel, which is apt to cause the slurry to flow into the reflux condenser. As a result, not only such a problem arises that polymer scale is deposited in the condenser, but also the heat dissipation ability of the reflux condenser is lowered and therefore it becomes difficult to control favorably the reproducibility of the quality of heat dissipation by the reflux condenser for each batch.

Further, in the case of a large-sized polymerization vessel, if a multiple-stage continuous operation including 100 batches or more is carried out, since deposition of scale becomes conspicuous at the part of the polymerization vessel inner wall that is in contact with the gaseous phase or at the part of the polymerization vessel inner wall near the interface between the gaseous phase and the liquid phase, such problems arise that the cooling ability of the reflux condenser is lowered and the scale mingled into the polymer degrades the quality of the resulting polymer.

SUMMARY OF THE INVENTION

An object of the present invention is to provide a process of producing a vinyl chloride type polymer wherein even if a long-term operation is carried out using a large-sized polymerization vessel, since the quantity of heat dissipation by a reflux condenser can be kept stable, the quality of the polymer for each batch is stabilized and deposition of scale is hard to occur.

The inventors of the present invention have studied earnestly and have found that since the so-called noncondensable gases (normally dissolved in the contents of the polymerization vessel), such as nitrogen and oxygen that concomitantly come into the polymerization vessel during the production process, and nitrogen, carbon monoxide, and carbon dioxide which are produced by decomposition of a polymerization initiator, particularly in the case of a large-sized vertically elongate polymerization vessel, are concentrated and accumulated in the reflux condenser, the monomer that has evaporated is prevented from being condensed and the heat dissipation by the reflux condenser cannot be retained. They have found that the above object can be accomplished by evacuating the noncondensable gases from the reflux condenser under prescribed conditions at least before the start of cooling by the reflux condenser to increase the heat dissipation efficiency of the reflux condenser and by using specific stirring blades, leading to the present invention.

The present invention provides a process of producing a vinyl chloride type polymer, comprising suspension polymerizing vinyl chloride monomer or a vinyl monomer mixture mainly made up of vinyl chloride monomer in an aqueous medium in the presence of an oil-soluble polymerization initiator in a polymerization apparatus which comprises (a) a generally cylindrical polymerization vessel constructed of a cylindrical straight barrel, a generally semispherical top part and a generally semispherical bottom part which parts close the top and bottom of the straight barrel respectively, (b) stirring impellers, each having impeller blades, tiered along a rotating shaft arranged on the center line or axis of said polymerization vessel, (c) a reflux condenser arranged at the upper part of said polymerization vessel for condensing monomer vapor generated in said polymerization vessel and flowing back the resulting condensate into said polymerization vessel, and (d) a heating and cooling jacket arranged around said polymerization vessel for heating and cooling liquid contents in said polymerization vessel, while stirring said vinyl chloride monomer or said vinyl monomer mixture by said stirring impellers and evacuating noncondensable gases evaporated from said contents, wherein said polymerization apparatus is such a polymerization apparatus that the inner volume of the polymerization vessel is 100 m$^3$ or more, the ratio L/D of the length L of the straight barrel to the inner diameter D is 1.5 or more, and the uppermost stirring impeller is arranged such that the height of the center line of the vertical width of its impeller blade is in the range of 150 to 300 cm downwardly from the upper end position of the straight barrel of the polymerization vessel, wherein after the contents in the polymerization vessel are heated to an intended polymerization temperature or a temperature near said polymerization temperature, the noncondensable gases coming into the reflux condenser are evacuated under such conditions that the flow rate of the evacuation is 10 to 100 Nm$^3$/hour and the evacuation time is a period equal to 20% or more of the total polymerization time, and wherein simultaneously with or after the start of the evacuation of the noncondensable gases, cooling by the reflux condenser is started.

According to the present invention, even if a long-term operation is carried out by using a large-sized polymerization vessel, since the quantity of heat dissipation by the reflux condenser can be kept stable, a polymer of a good and stable quality can be obtained and scale can be prevented from being deposited in the polymerization vessel.

DETAILED DESCRIPTION OF THE PREFERRED EMBODIMENTS

Now, the present invention will be described in detail.

Figure 1:
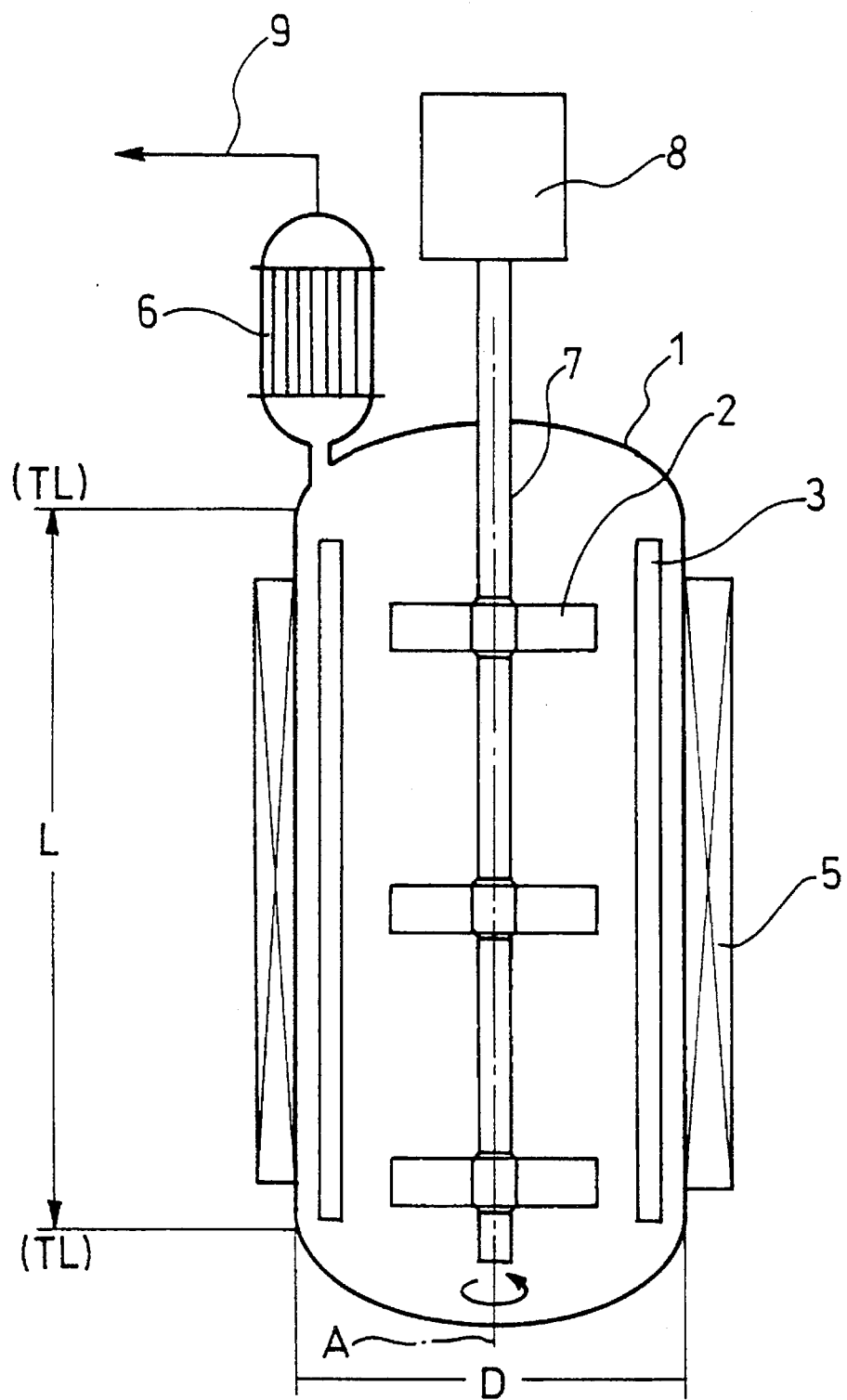
FIG. 1 is a schematic view exemplifying a polymerization apparatus used in the present invention.

The polymerization vessel to which the production process of the present invention is applied is basically a generally cylindrical polymerization vessel 1 constructed of a cylindrical straight barrel, a generally semispherical top part and a generally semispherical bottom part, which parts close respectively the top and the bottom of the cylindrical straight barrel, as shown in FIG. 1. The inner volume of the polymerization vessel 1 is 100 m³ or more, and preferably 100 to 200 m³, and the ratio L/D of the length L of the straight barrel to the inner diameter D of the polymerization vessel is 1.5 or more, and preferably 1.5 to 2.5.

Figure 2:
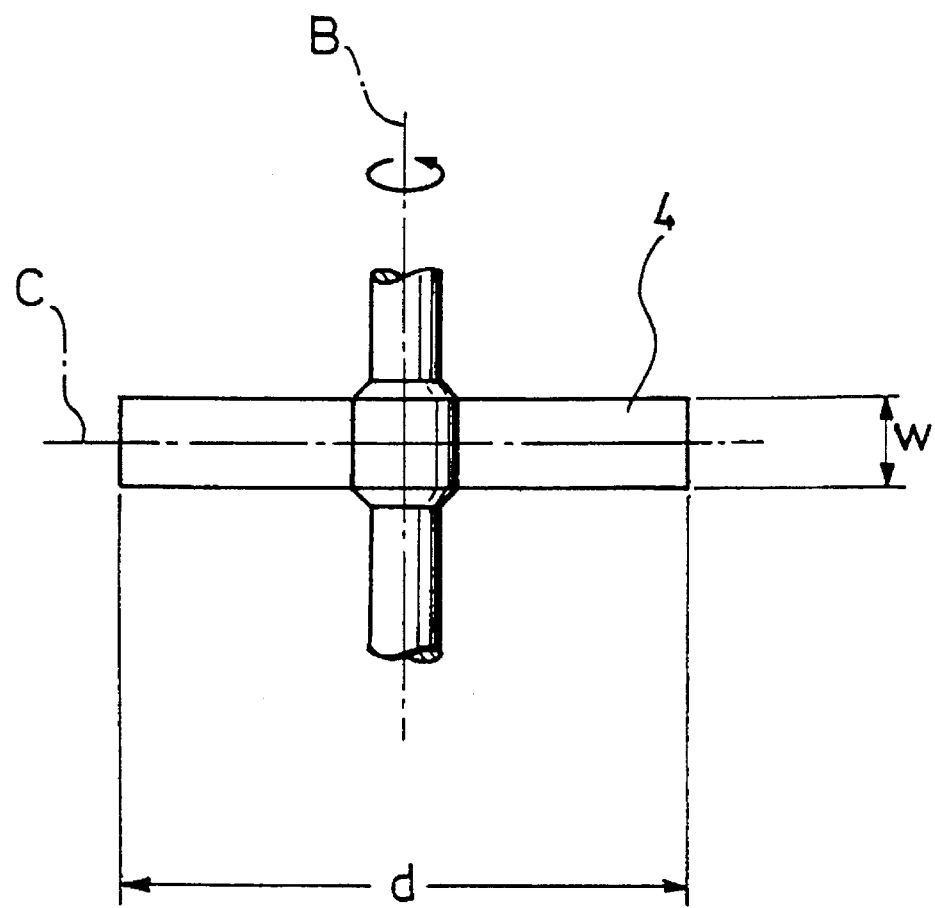
FIG. 2 is a schematic view exemplifying a stirring impeller used in the present invention.
Figure 3:
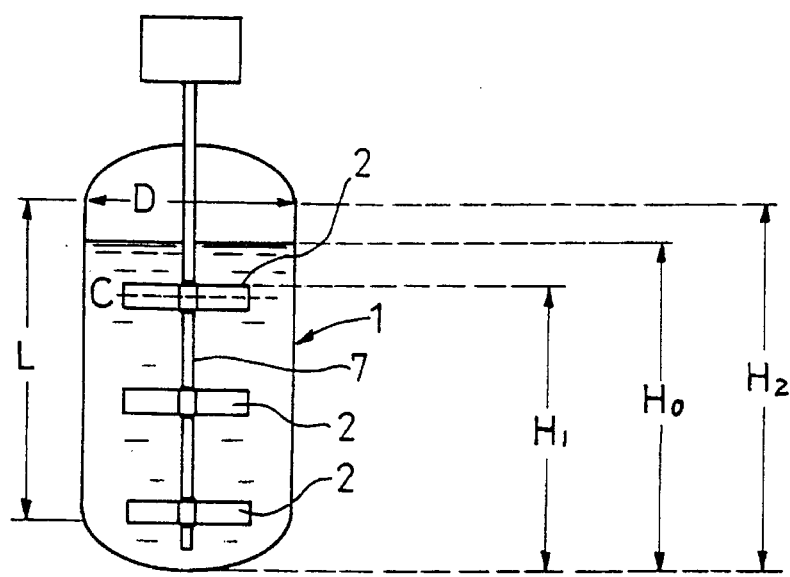
FIG. 3 is a view illustrating the position of arrangement of the uppermost stirring impeller used in the present invention.

As shown in FIG. 1, a plurality, preferably 3 or more, more preferably 3 to 5, of the stirring impellers used in the present invention are arranged along a rotating shaft 7 arranged on the center line A of the polymerization vessel 1 and the uppermost stirring impeller 2 is arranged, for example, as shown in FIG. 2, in the range of 150 to 300 cm downwardly on the basis of the upper end position TL of the straight barrel of the polymerization vessel 1 in terms of the height of the center line C of the vertical width w of the impeller blade of the uppermost stirring impeller. Further, preferably the uppermost stirring impeller 2 is arranged such that $H_1 = 1.3D$ to $1.85D$ wherein $H_1$ denotes the height of the upper edge of the impeller blade of the uppermost stirring impeller, and D has the same meaning as defined above. In this case, preferably the materials to be charged into the polymerization vessel are charged such that both the relations:

$$\frac{10}{9} H_1 \leq H_0 \leq \frac{100}{65} H_1 \text{ and } H_0 < H_2,$$

wherein $H_0$ denotes the height of the liquid surface of the contents that have not yet been reacted, $H_1$ has the same meaning as defined above, and $H_2$ denotes the height of the upper end of the straight barrel, are simultaneously satisfied.

In the production process of the present invention, due to the use of the thus arranged stirring impellers 2, particularly in the case where the operation is carried out continuously in 100 batches or more using the reflux condenser at all times, the slurry in a foamed state staying at the gas-liquid interface is reduced, which in concert with a cleaning effect at the interface part can suppress remarkably the growth of scale. If this position of the arrangement is more than 150 cm downwardly from the upper end position TL, the bulk specific gravity of the resulting vinyl chloride polymer is lowered, the particle size distribution becomes broad, fish eyes are increased, and scale is apt to be deposited at the interface part in the polymerization vessel. On the other hand, if this position of the arrangement is less than 300 cm downwardly from the upper end position TL, fish eyes of the resulting vinyl chloride polymer are increased and scale is apt to be deposited at the interface part in the polymerization vessel.

As the stirring impeller, a known stirring impeller can be used, and, for example, a paddle impeller, a pitched paddle impeller, a Brumagin type impeller, a Pfaudler impeller, a turbine impeller, and a propeller impeller can be used. In particular, preference is given to paddle impellers each having a plurality of plate-like and generally rectangular impeller blades 4 radially arranged around the rotating shaft B as shown in FIG. 2. The number of the impeller blades 4 is generally 2 to 6, and preferably 2.

The size of the blade 4 is not particularly restricted so long as it does not affect the rotation, but preferably the size satisfies the following relations:

$$0.35 \leq d/D \leq 0.55, \text{ and } 0.10 \leq n \cdot w/D \leq 0.16$$

wherein D have the same meaning as defined above, d denotes an impeller diameter as shown in FIG. 2, w denotes a vertical width of the impeller blade 4, and n is the number of the paddle impellers 2.

A combination of these paddle impellers with other stirring impellers is also preferable, and an example is a combination of paddle impellers 2a, 2c with pitched paddle impellers 2b, 2d (the angle of inclination of the blade of the pitched paddle impellers is, for example, 45 degrees with the rotating shaft B). In this case, the positional relationship of the paddle impellers with the other stirring impellers is not particularly restricted and may be appropriately decided so that the mixing of the contents may be carried out uniformly.

Such stirring impellers 2 are fixed to a rotating shaft 7 and the rotating shaft 7 is driven by an electric motor 8 placed at the upper part or the lower part of the polymerization vessel 1. The impeller speed in r.p.m. by the electric motor 8 is preferably such that the speed of the forward end of the stirring impeller 2 will fall in the range of 7 to 15 m/s. To do so, the driving force (stirring power of the stirring impeller) of the electric motor 8 is preferably 80 to 170 kg·m/s per ton of the contents in the polymerization vessel 1.

Figure 4:
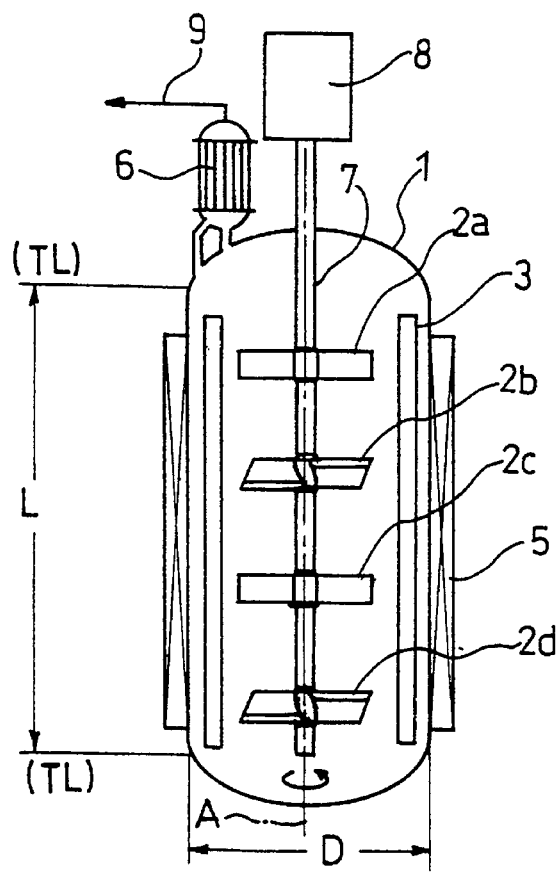
FIG. 4 is a schematic view of other polymerization apparatus used in the present invention.

Examples of the reflux condenser used in the present invention include a directly connected type condenser which is arranged, as shown in FIG. 1, at the upper part of the polymerization vessel 1, condenses monomer vapor generated in the polymerization vessel 1 through one conduit provided at the lower end of the condenser, and allows the resulting condensate to flow back into the polymerization vessel 1 through the same conduit, and a separate type condenser, as shown in FIG. 4, which condenses monomer vapor generated in the polymerization vessel 1 through the side conduit among two conduits provided at the lower end of the condenser and allows the condensed monomer to flow back into the polymerization vessel 1 through the central conduit. Therefore, as the reflux condenser 6, a known reflux condenser may be used which has such a structure that the reflux condenser is connected to the polymerization vessel itself through one or more conduits through which the vapor and the condensate flows, and examples include a coil type reflux condenser, a spiral type reflux condenser, a multi-tubular type reflux condenser, and a shell-and-tube type reflux condenser, with preference being given to a shell-and-tube type reflux condenser inter alia. The heat transfer area of the reflux condenser is preferably 60 to 300 m². Reference numeral 9 indicates a discharge outlet for non-condensable gases.

In the production process of the present invention, after the temperature in the polymerization vessel is elevated near to the polymerization temperature, the evacuation of noncondensable gases in the reflux condenser is started and the cooling by the reflux condenser is started.

The polymerization temperature may be any polymerization temperatures known in suspension polymerization of vinyl monomers and is generally 35° to 60° C.

The time when the evacuation of noncondensable gases is carried out is after the temperature of the polymerization vessel was elevated to near the polymerization temperature, and generally after the temperature of the polymerization vessel reached (t-5)°C. to t°C., and preferably (t-2)°C. to t°C., wherein t denotes the polymerization temperature. If the evacuation is carried out prematurely, foaming occurs in the polymerization vessel, and the foam containing the polymerization initiator goes concomitantly into the gaseous phase part and the condenser, causing the formation of scale to increase and the resulting foamed polymer to contaminate the intended polymer, which sometimes leads to the formation of fish eyes in the vinyl chloride polymer product obtained from that polymer.

Generally, the elevation of the temperature is carried out by passing hot water or steam through a heating and cooling jacket 5 arranged around the polymerization vessel 1 as shown in FIG. 1 for heating and cooling the contents in the polymerization vessel 1.

The elevation to the above temperature range causes noncondensable gases dissolved in the contents of the polymerization vessel to evaporate from the liquid phase and them to accumulate in the gaseous phase part. Since the noncondensable gases are smaller in specific gravity than vinyl chloride monomer, they are concentrated in the gaseous phase part of the polymerization vessel and in the reflux condenser.

The way of evacuating the noncondensable gases is not particularly restricted and an example is a method wherein the evacuation is carried out through a discharge outlet provided at the top of the reflux condenser 6 by, for example, a pump (not shown).

Generally, the flow rate of the noncondensable gases evacuated from the reflux condenser is 10 to 100 Nm$^3$/hour, and preferably 10 to 60 Nm$^3$/hour. If the flow rate is less than 10 Nm$^3$/hour, since it is difficult to keep constant the quantity of heat dissipation by the reflux condenser for each batch, it becomes difficult to control the polymerization temperature invariably, scale is apt to be deposited at the interface part in the polymerization vessel, and fish eyes in the resulting vinyl chloride polymer are increased. If the flow rate exceeds 100 Nm$^3$/hour, since foaming in the polymerization vessel becomes violent, scale is apt to be deposited at the interface in the polymerization vessel, fish eyes in the resulting vinyl chloride polymer are increased, and the yield of the polymer is lowered.

The evacuation of noncondensable gases is continuously carried out for a period equal to 20% or more, preferably 20 to 80%, and more preferably 20 to 60% or more, of the total polymerization time. If the evacuation time is less than 20% based on the total polymerization time, since it is difficult to keep constant the quantity of heat dissipation by the reflux condenser, it becomes difficult to control the polymerization temperature invariably, scale is apt to be deposited at the interface in the polymerization vessel, and fish eyes in the resulting vinyl chloride polymer are increased.

Thus, in the production process of the present invention, simultaneously with or after the start of the evacuation of noncondensable gases, cooling by a reflux condenser is started and the monomer is polymerized while controlling the quantity of heat dissipation.

As the method of controlling the quantity of heat dissipation by a reflux condenser, for example, a method wherein the temperature and the flow rate of cooling water are controlled (see Japanese Pre-examination Patent Publication (KOKAI) No. 57-8206) may be used, and specifically it is preferable to control the quantity of heat dissipation suitably in the range of 500,000 to 2,000,000 kcal/hour.

The polymerization apparatus used in the production process of the present invention may be provided with, in addition to the above polymerization vessel, stirring impellers, reflux condenser, and heating and cooling jacket, baffles 3 as shown in FIG. 1.

As the baffle 3, any known suitable baffles can be used, and, for example, one to eight baffles in the shape of a flat plate, a pipe, or the like are placed vertically along the inner wall of the polymerization vessel in position.

In the production process of the present invention, as the monomer, not only vinyl chloride can be used singly, but also a monomer mixture made up of vinyl monomer as a major constituent and a comonomer copolymerizable with vinyl chloride (generally the monomer mixture contains 50% by weight or more of vinyl chloride) can be used. Such a comonomer includes vinyl esters, such as vinyl acetate and vinyl propionate; acrylic esters or methacrylic esters, such as methyl acrylate and ethyl acrylate; olefins, such as ethylene and propylene; maleic anhydride; acrylonitrile; styrene; α-methylstyrene; and vinylidene chloride. These may be used singly or as a combination of two or more thereof.

The amount of an aqueous medium (water) charged for use in suspending and dispersing polymerized components of the monomer may be similar to that in the conventional method, that is, the charge ratio (water/monomer) of the water to the monomer may be about from 1.0 to 1.5 (by weight), and, if desired, water can be added in the course of the polymerization.

In order to stabilize the polymerization system (the contents made up of the suspended and dispersed liquid), for example, polyvinyl alcohol; water-soluble and oil-soluble methyl cellulose and ethyl cellulose; water-soluble cellulose ethers, such as hydroxyethyl cellulose, hydroxypropyl cellulose, and hydroxypropyl methyl cellulose; water-soluble polymers, such as polyacrylic acid and gelatin; oil-soluble emulsifiers, such as sorbitan monolaurate, sorbitan trioleate, sorbitan monostearate, glycerin tristearate, and an ethylene oxide/propylene oxide block copolymer; water-soluble emulsifiers, such as polyoxyethylene sorbitan monolaurate, polyoxyethylene glycerin oleate, and sodium laurate; calcium carbonate, calcium phosphate, or sodium dodecylbenzenesulfonate may be used in a small amount in the range where the objects of the present invention will not be injured. These may be used singly or as a combination of two or more thereof.

The amount of these suspending agents to be added is 0.01 to 5 parts by weight per 100 parts by weight of the charge monomer.

The oil-soluble polymerization initiator used in the present invention can include, for example, percarbonate compounds, such as diisopropyl peroxydicarbonate, di-2-ethylhexyl peroxydicarbonate, and diethoxyethyl peroxydicarbonate; perester compounds, such as t-butyl peroxypivalate, t-hexyl peroxypivalate, t-butyl peroxyneodecanoate, and α-cumyl peroxyneodecanoate; peroxides, such as acetylcyclohexylsulfonyl peroxide, 2,4,4-trimethylpentyl-2-peroxyphenoxyacetate, and 3,5,5-trimethylhexanoyl peroxide; and azo compounds, such as azobis-2,4-dimethylvaleronitrile and azobis(4-methoxy-2,4-dimethylvaleronitrile), which may be used singly or as a combination of two or more thereof.

The amount of these oil-soluble polymerization initiators to be added is generally 0.01 to 3 parts by weight per 100 parts by weight of the monomer charged.

As the aqueous medium, deionized water is generally used. Further, to this polymerization system, if desired, a polymerization adjuster, a chain transfer agent, a pH adjuster, a gelation improver, an antistatic agent, a crosslinking agent, a stabilizer, a filler, an antioxidant, a buffer, and the like which are suitably used in vinyl chloride type polymerization may be optionally added.

In carrying out the production process of the present invention, a scale deposition preventive agent may be previously applied to the polymerization vessel inner wall and the like. As the scale deposition preventive agent, any known scale deposition preventive agents can be used, such as, a self-condensation product of polyhydric phenols and polyhydric naphthols (Japanese Pre-examination Patent Publication (KOKAI) No. 54-7487); a condensation product of 1-naphthol and formaldehyde (Japanese Pre-examination Patent Publication (KOKAI) No. 57-164107); a condensation product of phenol compounds with aldehydes (Japanese Pre-examination Patent Publication (KOKAI) No. 54-36389); a mixed solution of a quinone-amine compound with an organic silica sol (Japanese Pre-examination Patent Publication (KOKAI) No. 1-135802); naphthols and sulfide compounds (Japanese Pre-examination Patent Publication (KOKAI) No. 4-311702); a mixture and/or a reaction product of an electron-donating dye with an arylsulfonic acid (Japanese Pre-examination Patent Publication (KOKAI) No. 5-70505); a phenothiazine derivative (Japanese Pre-examination Patent Publication (KOKAI) No. 5-501892); a quinone compound and/or its reduction-treated product (Japanese Pre-examination Patent Publication (KOKAI) No. 5-279404); a reaction product of a ketone resin with a phenolic compound (Japanese Pre-examination Patent Publication (KOKAI) No. 62-236804); a dye, a pigment, an aromatic compound having 5 or more conjugated π-bonds, and a heterocyclic compound having 5 or more conjugated π-bonds (U.S. Pat. No. 4,757,124); a polyaromatic amine (U.S. Pat. No. 4,024,330); a salt of a cationic compound with an anionic compound (GB No. 2,170,604); a reaction product of a polyvinyl alcohol with aminobenzoic acid (EP No. 0498142A1); and an initial-condensation modified product of phenols with aldehydes (Japanese Pre-examination Patent Publication (KOKAI) No. 6-01884).

In the production process of the present invention, other conditions in the polymerization and the method of charging an aqueous medium, vinyl chloride monomer, and, in some cases, other comonomer, a suspending agent, a polymerization initiator, and the like into the polymerization vessel may be the same as the conventional conditions and method, and although the conditions of charging them may be the same as the conventional conditions, generally, they are charged such that 80 to 90% and preferably 82 to 87%, of the volume of the polymerization vessel is filled with them. Such a charge brings the liquid surface almost near to the upper end position TL of the straight barrel of the polymerization vessel in the state of the above stirring impellers being rotated.

EXAMPLES

Example 1

Use was made of a polymerization apparatus as shown in FIG. 1 which was equipped with (a) a generally cylindrical polymerization vessel 1 constructed of a cylindrical straight barrel, a semispherical top part and a semispherical bottom part, which parts closed the top and the bottom thereof respectively, and having an internal volume of 130 m³ with the ratio L/D of the length (L: 7,900 mm) of the straight barrel to the inner diameter (D: 4,200 mm) being 1.88, (b) a heating and cooling jacket 5, (c) three stirring impellers 2, each having impeller blades, comprising paddle impellers arranged along a rotating shaft 7 (the uppermost stirring impeller was placed at 250 cm downwardly from the upper end position TL of the straight barrel of the polymerization vessel in terms of the height of the center line C of the vertical width of the impeller blade of the same stirring impeller), (d) baffles 3, and (e) a reflux condenser (of shell-and-tube type and having a heat transfer area of 150 m²) 6 having a discharge outlet at the top.

An aqueous solution of 57,500 kg of deionized water, 13.8 kg of a partially saponified polyvinyl alcohol, and 9.2 kg of hydroxypropyl methyl cellulose was charged into the polymerization vessel. Thereafter, the polymerization vessel was evacuated to bring the internal pressure of the polymerization vessel to 60 mmHg by a vacuum pump. Then, 46,000 kg of vinyl chloride monomer was charged, 25.3 kg di-2-ethylhexyl peroxydicarbonate as a polymerization initiator was pumped into the polymerization vessel with stirring, and then hot water was passed through the jacket to start the elevation of the temperature. At that time, the stirring power (the driving power of the electric motor) was 130 kg/s per weight ton of the contents of the polymerization vessel. Additionally stating, the liquid surface $H_0$ of the contents of the polymerization vessel at rest was 853 cm. The height $H_1$ of the upper edge of the uppermost stirring impeller was 655 cm, and the height $H_2$ of the upper end of the straight barrel was 895 cm, both the relations:

$$\frac{10}{9} H_1 \leq H_0 \leq \frac{100}{65} H_1 \text{ and } H_0 < H_2,$$

being satisfied simultaneously, and $H_1$ being 1.56D.

Then, when the temperature of the mixture in the polymerization vessel reached 57° C., noncondensable gases were evacuated from the discharge outlet provided at the top of the reflux condenser at a flow rate of 50 Nm³/hour for 3 hours. At the same time with the start of the discharge of noncondensable gases, water is passed through the reflux condenser to cool it and the polymerization reaction was carried out with the polymerization temperature being kept at 57° C., and when the internal pressure of the polymerization vessel reached 6.0 kg.m2 (gauge pressure), the polymerization was stopped, the unreacted monomer was recovered, the obtained polymer in the state of slurry was removed outside of the polymerization vessel, the state of the deposition of scale in the polymerization vessel was observed, and the obtained polymer was dehydrated and dried and was tested in accordance with the following methods. The results are shown in Table 1.

The state of the deposition of scale in the polymerization vessel:

The evaluation was made on the basis of the following criterion after polymerization in batches of 100 by each production process.

○: there was little deposition of scale.

△: scale was partially observed at the gaseous phase/liquid phase interface part.

×: scale was observed at all the gaseous phase/liquid phase interface part.

Measurement of the bulk specific gravity:

The bulk specific gravity of the obtained polymer was measured in accordance with JIS K-6721.

Measurement of the particle size distribution (distribution of sizes of particles passed through sieves):

The obtained polymer was sifted through #60, #100, and #200 sieves in accordance with JIS Z-8801 and the passed amounts were measured in % by weight.

Measurement of fish eyes:

100 parts by weight of the obtained polymer, 50 parts by weight of DOP, 0.1 part by weight of barium stearate, 0.1 part by weight of cadmium stearate, 0.8 part by weight of cetanol, 2.0 parts by weight of a tin type stabilizer, 0.5 part by weight of titanium dioxide, and 0.1 part by weight of carbon black were mixed and kneaded by a 6-inch roll mill for 5 min at 140° C., and the resulting mixture was formed into a sheet having a thickness of 0.3 mm. The number of transparent particles formed in the obtained sheet per 100 cm² was counted.

Comparative Example 1

The polymerization of Example 1 was repeated, except that the evacuation of noncondensable gases was carried out for 45 min after the temperature was elevated to the polymerization temperature. Since the quantity of heat dissipation by the reflux condenser during the polymerization did not reach the predetermined $1.3 \times 10^6$ kcal/hour, the temperature of the contents of the polymerization vessel was increased by 1.5°0 C. from the predetermined temperature of 57° C. The obtained polymer was tested similarly to Example 1. The results are shown in Table 1. The relations of $H_1$, $H_0$, $H_2$, and D were the same as those in Example 1.

Comparative Example 2

The polymerization of Example 1 was repeated, except that the evacuation flow rate of noncondensable gases was set at 150 Nm³/hour. The obtained polymer was tested similarly to Example 1. The results are shown in Table 1. The relations of $H_1$, $H_0$, $H_2$, and D were the same as those in Example 1.

Comparative Example 3

The polymerization of Example 1 was repeated, except that the evacuation flow rate of noncondensable gases was set at 5 Nm³/hour. Since the quantity of heat dissipation by the reflux condenser during the polymerization did not reach the predetermined $1.3 \times 10^6$ kcal/hour, the temperature of the contents of the polymerization vessel was increased by 1.5° C. from the predetermined temperature of 57° C. The obtained polymer was tested similarly to Example 1. The results are shown in Table 1. The relations of $H_1$, $H_0$, $H_2$, and D were the same as those in Example 1.

Comparative Example 4

The polymerization of Example 1 was repeated, except that the position of the uppermost stirring impeller was changed such that the position was at 100 mm downwardly from the upper end position TL of the straight barrel of the polymerization vessel. The obtained polymer was tested similarly to Example 1. The results are shown in Table 1. $H_1$ was 805 cm, not satisfying simultaneously the relations:

$$\frac{10}{9} H_1 \leq H_0 \leq \frac{100}{65} H_1 \text{ and } H_0 < H_2,$$

and $H_1$ being 1.92D.

Comparative Example 5

The polymerization of Example 1 was repeated, except that the position of the uppermost stirring impeller was changed such that the position was at 400 mm downwardly from the upper end position TL of the straight barrel of the polymerization vessel. The obtained polymer was tested similarly to Example 1. The results are shown in Table 1. $H_1$ was 505 cm, not satisfying simultaneously the relations:

$$\frac{10}{9} H_1 \leq H_0 \leq \frac{100}{65} H_1 \text{ and } H_0 < H_2,$$

and $H_1$ being 1.20D.

TABLE 1

|  | Example 1 | Comparative Example 1 | Comparative Example 2 |
| --- | --- | --- | --- |
| Evacuation flow rate of noncondensable gases | 50 Nm³/hour | 50 Nm³/hour | 150 Nm³/hour |
| Evacuation time of noncondensable gases | 3 hours after the temperature was elevated to the polymerization temperature | 45 min after the temperature was elevated to the polymerization temperature | 3 hours after the temperature was elevated to the polymerization temperature |
| Quantity of heat dissipation by the reflux condenser | $1.3 \times 10^6$ kcal/hour from the start of the polymerization | *1 | $1.3 \times 10^6$ kcal/hour from the start of the polymerization |
| Polymerization time | 5 hours and 10 min | 5 hours and 0 min | 5 hours and 5 min |
| Bulk specific gravity | 0.525 | 0.520 | 0.521 |
| Particle size distribution |  |  |  |
| #60 | 100 | 99.5 | 99.6 |
| #100 | 60.1 | 59.2 | 58.2 |
| #200 | 0.9 | 1.2 | 1.0 |
| Fish eyes | 1 | 20 | 25 |
| Deposition of scale | little deposition | There was scale at some portions of the interface part. | There was scale at all the interface part. |
| Uppermost impeller position (downwardly from the upper TL position) | at 250 cm | at 250 cm | at 250 cm |

|  | Comparative Example 3 | Comparative Example 4 | Comparative Example 5 |
| --- | --- | --- | --- |
| Evacuation flow rate of noncondensable gases | 5 Nm³/hour | 50 Nm³/hour | 150 Nm³/hour |
| Evacuation time of noncondensable gases | 3 hours after the temperature was elevated to the polymerization temperature | 3 hours after the temperature was elevated to the polymerization temperature | 3 hours after the temperature was elevated to the polymerization temperature |
| Quantity of heat dissipation by the reflux condenser | *1 | $1.3 \times 10^6$ kcal/hour from the start of the polymerization | $1.3 \times 10^6$ kcal/hour from the start of the polymerization |
| Polymerization time | 5 hours and 0 min | 5 hours and 10 min | 5 hours and 10 min |
| Bulk specific gravity | 0.520 | 0.501 | 0.520 |
| Particle size distribution |  |  |  |
| #60 | 99.4 | 99.0 | 99.3 |
| #100 | 58.2 | 61.2 | 59.2 |
| #200 | 1.3 | 3.1 | 1.3 |
| Fish eyes | 30 | 26 | 50 |
| Deposition of scale | There was scale at all the interface part. | There was scale at all the interface part. | There was scale at all the interface part. |
| Uppermost impeller position (downwardly from the upper TL position) | at 250 cm | at 100 cm | at 400 cm |

*1 indicates that the internal temperature was increased by 1.5° C. since the quantity of heat dissipation by the reflux condenser did not reach the predetermined $1.3 \times 10^6$ kcal/hour.

Example 2

Use was made of a polymerization apparatus as shown in FIG. 1 that was equipped with (a) a generally cylindrical polymerization vessel 1 constructed of a cylindrical straight barrel, a semispherical top part and a semispherical bottom part, which parts closed the top and the bottom thereof respectively, and having an internal volume of 100 m³ with the ratio L/D of the length (L: 7,240 mm) of the straight barrel to the inner diameter (D: 3,850 mm) being 1.88, (b) a heating and cooling jacket 5, (c) three stirring impellers 2, each having impeller blades, comprising paddle impellers arranged along a rotating shaft 7 (the uppermost stirring blade was placed at 240 cm downwardly from the upper end position TL of the straight barrel of the polymerization vessel in terms of the height of the center line C of the vertical width of the impeller blade of the same stirring impeller), (d) baffles 3, and (e) a reflux condenser (of shell-and-tube type and having a heat transfer area of 120 m²) 6 having a discharge outlet at the top.

An aqueous solution of 44,300 kg of deionized water, 10.6 kg of a partially saponified polyvinyl alcohol, and 7.1 kg of hydroxypropyl methyl cellulose was charged into the polymerization vessel. Thereafter, the polymerization vessel was evacuated to bring the internal pressure of the polymerization vessel to 60 mmHg by a vacuum pump. Then, 35,400 kg of vinyl chloride monomer was charged, 19.5 kg di-2-ethylhexyl peroxydicarbonate as a polymerization initiator was pumped into the polymerization vessel with stirring, and then hot water was passed through the jacket to start the elevation of the temperature. At that time, the stirring power (the driving power of the electric motor) was 130 kg/s per weight ton of the contents of the polymerization vessel. Additionally stating, the liquid surface $H_0$ of the contents of the polymerization vessel was 782 cm. The height $H_1$ of the upper edge of the uppermost stirring blade was 590 cm, and the height $H_2$ of the upper end of the straight barrel was 820 cm, satisfying simultaneously the relations:

$$\frac{10}{9} H_1 \leq H_0 \leq \frac{100}{65} H_1 \text{ and } H_0 < H_2,$$

and $H_1$ being 1.53D.

Then, when the temperature of the mixture in the polymerization vessel reached 57° C., noncondensable gases were evacuated from the discharge outlet provided at the top of the reflux condenser at a flow rate of 40 Nm³/hour for 3 hours. At the same time with the start of the discharge of noncondensable gases, water is passed through the reflux condenser to cool it and the polymerization reaction was carried out with the polymerization temperature kept at 57° C., and when the internal pressure of the polymerization vessel reached 6.0 kg/m² (gauge pressure), the polymerization was stopped, the unreacted monomer was recovered, the obtained polymer in the state of slurry was removed outside of the polymerization vessel, the state of the deposition of scale in the polymerization vessel was observed, and the obtained polymer was dehydrated and dried and was tested in accordance with the same methods as those in Example 1. The results are shown in Table 2.

Example 3

Use was made of a polymerization apparatus as shown in FIG. 4 that was equipped with (a) a generally cylindrical polymerization vessel 1 constructed of a cylindrical straight barrel, a semispherical top part and a semispherical bottom part, which parts closed the top and the bottom thereof respectively, and having an internal volume of 100 m³ with the ratio L/D of the length (L: 7,240 mm) of the straight barrel to the inner diameter (D: 3,850 mm) being 1.88, (b) a heating and cooling jacket 5, (c) four stirring impellers 2, each having impeller blades, comprising paddle impellers arranged along a rotating shaft 7 (the uppermost stirring impeller was placed at 240 cm downwardly from the upper end position TL of the straight barrel of the polymerization vessel in terms of the height of the center line C of the vertical width of the impeller blade of the same stirring impeller), (d) baffles 3, and (e) a reflux condenser 6 (of shell-and-tube type and having a heat transfer area of 120 m²) having a discharge outlet at the top. Incidentally, the relations of $H_1$, $H_0$, $H_2$, and D were the same as those in Example 2.

Then the polymerization reaction in Example 2 was repeated, except that the above polymerization apparatus was used. The obtained polymer in the state of slurry was removed outside of the polymerization vessel, the state of the deposition of scale in the polymerization vessel was observed, and the obtained polymer was dehydrated and dried and was tested in accordance with the same methods as those in Example 1. The results are shown in Table 2.

TABLE 2

|  | Example 2 | Example 3 |
|---|---|---|
| Evacuation flow rate of noncondensable gases | 40 Nm³/hour | 40 Nm³/hour |
| Evacuation time of noncondensable gases | 3 hours after the temperature was elevated to the polymerization temperature | 3 hours after the temperature was elevated to the polymerization temperature |
| Quantity of heat dissipation by the reflux condenser | $1.0 \times 10^6$ kcal/hour from the start of the polymerization | $1.0 \times 10^6$ kcal/hour from the start of the polymerization |
| Polymerization time | 5 hours and 10 min | 5 hours and 10 min |
| Bulk specific gravity | 0.526 | 0.529 |
| Particle size distribution |  |  |
| #60 | 100 | 100 |
| #100 | 62.3 | 68.9 |
| #200 | 1.0 | 1.0 |
| Fish eyes | 1 | 2 |
| Deposition of scale | little deposition | little deposition |
| Uppermost impeller position (downwardly from the upper TL position) | at 240 cm in the apparatus shown in FIG. 1 | at 240 cm in the apparatus shown in FIG. 4 |

What is claimed is:

1. A process of producing a vinyl chloride containing polymer, comprising suspension polymerizing vinyl chloride monomer or a vinyl monomer mixture mainly made up of vinyl chloride monomer in an aqueous medium in the presence of an oil-soluble polymerization initiator in a polymerization apparatus which comprises (a) a cylindrical polymerization vessel constructed of a cylindrical straight barrel, a semispherical top part and a semispherical bottom part, which parts close the top and bottom of the straight barrel respectively, (b) stirring impellers, each having impeller blades, tiered along a rotating shaft arranged on the center line of said polymerization vessel, (c) a reflux condenser arranged at the upper part of said polymerization vessel for condensing monomer vapor generated in said polymerization vessel and flowing back the resulting condensate into said polymerization vessel, and (d) a heating and cooling jacket arranged around said polymerization vessel for heating and cooling liquid contents of said polymerization vessel, while stirring said vinyl chloride monomer or said vinyl monomer mixture by said stirring impellers and evacuating noncondensable gases evaporated from said contents, wherein said polymerization apparatus is such a polymerization apparatus that the inner volume of the polymerization vessel is 100 m³ or more, the ratio L/D of the length L of the straight barrel to the inner diameter D of the polymerization vessel is 1.5 or more, and an uppermost stirring impeller is arranged such that the height of a center line of the vertical width of its impeller blade is in the range of 150 to 300 cm downwardly from the upper end position of the straight barrel of the polymerization vessel, wherein after the contents in the polymerization vessel are heated to an intended polymerization temperature or a temperature near said polymerization temperature, the noncondensable gases coming into the reflux condenser are evacuated under such conditions that a flow rate of the evacuation is 10 to 100 Nm³/hour and the evacuation time is a period equal to 20% or more of the total polymerization time, and wherein simultaneously with or after the start of the evacuation of the noncondensable gases, cooling by the reflux condenser is started, and wherein materials to be charged into the polymerization vessel are charged such that both the relations:

$$\frac{10}{9} H_1 \leq H_0 \leq \frac{100}{65} H_1 \text{ and } H_0 < H_2,$$

wherein $H_0$ denotes the height of the liquid surface of the contents that have not yet been reacted, $H_1$ denotes the height of an upper edge of the impeller blade of the uppermost stirring impeller, and $H_2$ denotes the height of an upper end of the straight barrel are simultaneously satisfied.

2. The process of claim 1, wherein the inner volume of the polymerization vessel is 100 to 200 m³.

3. The process of claim 1, wherein the ratio L/D of the length L of the straight barrel to the inner diameter D is from 1.5 to 2.5.

4. The process of claim 1, wherein the number of the stirring impellers is 3 to 5.

5. The process of claim 1, wherein the uppermost stirring impeller is arranged in such a range that $H_1=1.3D$ to $1.85D$ wherein $H_1$ denotes the height of an upper edge of the blade of the same stirring impeller and D has the same meaning as defined in claim 1.

6. The process of claim 1, wherein the stirring impellers are paddle impellers each comprising a plurality of rectangular impeller blades radially arranged around the rotating shaft or a combination of said paddle impellers with other stirring impellers.

7. The process of claim 6, wherein the number of the impeller blades of each paddle impeller is 2 to 6.

8. The process of claim 1, wherein the stirring power of the stirring impellers is 80 to 170 kg·m/s per weight ton of the contents of the polymerization vessel.

9. The process of claim 1, wherein the reflux condenser is of shell-and-tube.

10. The process of claim 1, wherein the heat transfer area of the reflux condenser is 60 to 300 m².

11. The process of claim 1, wherein the polymerization temperature is 35° to 60° C.

12. The process of claim 1, wherein the contents in the polymerization vessel are heated to a temperature of (t-5) to t°C. wherein t denotes the polymerization temperature.

13. The process of claim 1, wherein the evacuation flow rate of noncondensable gases is 10 to 60 Nm³/hour.

14. The process of claim 1, wherein the evacuation time of noncondensable gases is a period equal to 20 to 80% of the total polymerization time.

15. The process of claim 1, wherein the quantity of heat dissipation at the time of the cooling by the reflux condenser is 500,000 to 2,000,000 kcal/hour.

16. The process of claim 1, wherein the weight ratio of the aqueous medium to the monomer or the monomer mixture is from 1.0 to 1.5.

17. The process of claim 1, wherein the amount of the oil-soluble polymerization initiator is 0.01 to 3 parts by weight per 100 parts by weight of the monomer or the monomer mixture.

18. The process of claim 1, wherein a suspending agent is added to the polymerization system.

19. The process of claim 1, wherein the monomer mixture is a mixture of vinyl chloride with at least one comonomer selected from the group consisting of vinyl esters, acrylates, methacrylates, olefins, maleic anhydride, acrylonitrile, styrene, α-methylstyrene, and vinylidene chloride.

* * * * *

UNITED STATES PATENT AND TRADEMARK OFFICE
CERTIFICATE OF CORRECTION

PATENT NO.   : 5,587,437
DATED        : Dec. 24, 1996
INVENTOR(S)  : Fumiaki ADACHI, et al.

It is certified that error appears in the above-indentified patent and that said Letters Patent is hereby corrected as shown below:

On the title page, in Item [75], the third inventor's name should read:
    --Yoshihiro Shirota--

Signed and Sealed this

Twenty-fifth Day of March, 1997

*Attest:*

BRUCE LEHMAN

*Attesting Officer*    *Commissioner of Patents and Trademarks*